United States Patent [19]

Nathoo et al.

[11] Patent Number: 5,009,409
[45] Date of Patent: Apr. 23, 1991

[54] METHOD AND APPARATUS FOR MANIPULATION OF FABRIC

[75] Inventors: Nazim S. Nathoo, Houston, Tex.; Fanis Giannopoulos, Scotch Plains, N.J.

[73] Assignee: Shell Oil Company, Houston, Tex.

[21] Appl. No.: 437,316

[22] Filed: Nov. 17, 1989

Related U.S. Application Data

[63] Continuation of Ser. No. 231,923, Aug. 15, 1988, abandoned.

[51] Int. Cl.$^5$ .............................................. B65H 3/08
[52] U.S. Cl. .................................... 271/90; 294/65
[58] Field of Search .................. 271/90, 91, 106, 97; 294/65

[56] References Cited

U.S. PATENT DOCUMENTS

| | | | |
|---|---|---|---|
| 2,798,757 | 7/1957 | Jackson | 294/64 |
| 3,275,317 | 9/1966 | Fromm | 271/106 |
| 3,314,676 | 4/1967 | Fromm | 271/106 |
| 3,362,706 | 1/1968 | Busse | 271/26 |
| 3,415,388 | 12/1968 | Hornlein | 214/8.5 |
| 3,430,949 | 3/1969 | Herdeg | 271/90 |
| 3,613,883 | 10/1971 | Starbuck | 271/1 X |
| 3,712,254 | 1/1973 | Beamish | 271/1 X |
| 3,780,884 | 12/1973 | Jones | 214/8.5 D |
| 3,796,455 | 3/1974 | Linkbom | 271/97 X |
| 3,848,752 | 11/1974 | Branch et al. | 214/1 BT |
| 3,901,502 | 8/1975 | Vits | 271/106 X |
| 3,920,128 | 11/1975 | Baker | 294/65 X |
| 4,231,563 | 11/1980 | Boucraut | 271/105 X |
| 4,483,702 | 11/1984 | Frank et al. | 65/273 |
| 4,511,387 | 4/1985 | Kellar et al. | 65/287 |
| 4,589,648 | 5/1986 | Hancock | 271/106 |
| 4,712,782 | 12/1987 | Mathias | 271/105 X |
| 4,793,657 | 12/1988 | Mense | 271/91 X |

FOREIGN PATENT DOCUMENTS

| | | |
|---|---|---|
| 2561221 | 9/1985 | France . |
| 208131 | 3/1984 | German Democratic Rep. ..... 271/105 |
| 98662 | 8/1978 | Japan ..... 294/65 |

*Primary Examiner*—Richard A. Schacher

[57] ABSTRACT

A method and apparatus are disclosed for the manipulation of at least one layer of porous fabric. Fluid flow through a portion of the porous fabric fluid-couples a layer or a plurality of layers of fabric to a movable flow locator having a plurality of flow openings defined therethrough. The operating parameters of the appratus may be adjusted such that many types of fiberglass cloth, woven or continuous strand mat may be sequentially manipulated by the apparatus to form a laminate structure.

1 Claim, 6 Drawing Sheets

FIGURE 9

TABLE 1

| Fabric Type | Fabric Areal Weight (lb/sq. ft) | Fabric Thickness (t, ft) | Void Fraction (E) | Characteristic Dimension (Dp, ft) | Area Ratio RA | | Calculated Velocity[1] (ft/min) | Measured Velocity[2] (ft/min) |
|---|---|---|---|---|---|---|---|---|
| Continuous Random Mat | 0.094 | 0.011 | 0.94 | $1.1 \times 10^{-3}$ | 110[+] | 1.5 | 1600 | 4000 |
| Chopped Strand Mat | 0.094 | $2.5 \times 10^{-3}$ | 0.76 | $1.1 \times 10^{-3}$ | 160[++] | 1.1 | 1000 | 1300 |
| Biax | 0.132 | $2.5 \times 10^{-3}$ | 0.67 | $3.6 \times 10^{-3}$ | 160[++] | 1.1 | 1500 | 1300 |
| Triax | 0.240 | $3.3 \times 10^{-3}$ | 0.54 | $3.6 \times 10^{-3}$ | 160[++] | 1.1 | 1100 | 1800 |

[1] Using Ergun Equation
[2] Using Sensor in Actual Operation
[++] Flow Locator A
[+] Flow Locator B

METHOD AND APPARATUS FOR MANIPULATION OF FABRIC

This is a continuation of application Ser. No. 231,923, filed Aug. 15, 1988 abandoned.

BACKGROUND OF THE INVENTION

This invention relates to the manipulation of porous fabrics, and more particularly, relates to the manipulation of "fiberglass" cloth, roving, chopped strand mat and continuous random mat during their assembly as primary reinforcement material in fiber reinforced plastic (FRP) articles of manufacture.

In many of these assembly operations pre-cut sheets of the fabrics having the desired shapes are stacked. If several fabrics will be used in the article, several corresponding stacks of the different fabrics are centrally located relative to the assembly operation. In a typical process for assembly of fabrics into a finished article, the "hand layup" method is used, wherein manual labor is used to assemble the different fabrics in a preferred order.

Since the invention therefor envisions the manipulation of sheets of material, a review of the prior patent literature is advisable. Note for example U.S. Pat. No. 3,362,706 wherein a flexible vacuum plate member is used to pick up stacked mailing envelopes. More specifically, this invention relates to apparatus for separating flat articles one at a time, and, more particularly, to apparatus for pneumatically removing the top article of a stack of such articles and preventing double and multiple removals.

The apparatus includes a suction head which is connected to a vacuum source and which is comprised of at least two sections which are moveable with respect to one another. The two sections of the suction head are advanced into engagement with the uppermost article of the stack. A partial vacuum is then applied to the suction head so that the uppermost article is held against the suction head. One of the sections is restrained while the other is retracted under the influence of atmospheric pressure. This causes the article to be bent around the edges of the sections of the suction head whereupon any additional articles which might adhere to the uppermost article fall back into the stack.

Additionally, a limit stop may be provided which engages the edge of the uppermost article which is being lifted by the suction head to bend the article into a generally S-shaped configuration. The restraining device is then released so that the two sections become aligned, permitting the separated article to assume again a generally flat configuration.

Reference also, for example, U.S. Pat. No. 3,415,388 which discloses a device for the removal of pre-shaped foils from a foil stack and insertion into production moulds, in installations for the production of foil-wrapped chocolate bodies. For obliquely arranged stacks of preshaped foils, the device has a suction head that is obliquely guided by a stationary guide rail against the bias of a spring. The suction head is geometrically similar to the preformed foil bodies and is three-dimensionally reduced with respect thereto at least in the outer edge region by multiple of the foil thickness, for example 1-2 millimeters to produce a gap having a wedge shape in cross-section.

Note that both of the previously referenced patents do not disclose manipulation of porous fabrics.

Other patents of interest would include U.S. Pat. No. 4,483,702 wherein a porous fiberglass cover is used with a vacuum holder system so as to provide passage for residual air and adjacent passages that ten to equalize when a sheet of glass is held against the porous cover. The apparatus is used to manipulate sheets of matter such as glass sheets, as also taught in U.S. Pat. No. 4,511,387, same assignee.

Reference may also be made to U.S. Pat. No. 3,848,752 wherein an apparatus for transferring glass sheets comprises a sequence of drive rollers above the transfer path and suction means arranged to draw the sheets against the rollers so that the sheets are advanced by the rollers. In order to release a sheet onto a stack, when the sheet has reached a predetermined position along the path, suction release means may be provided or mechanical means may be provided to force the sheet away from the rollers.

Reference may also be made to U.S. Pat. No. 3,780,884 which discloses an article transfer device comprising a first conveyor, a platform positioned to permit transfer of articles between said platform and said first conveyor, a vacuum manifold mounted above said platform, a plurality of vacuum cups depending from said manifold and each having a bore communicating the gripping surface thereof with said manifold, elevating means for raising and lowering said platform into and out of a position to cause articles carried by said platform to engage at least one of said vacuum cups, a shuttle extendable to a position underlying said vacuum cups and retractable to a position removed from said vacuum cups, and a second conveyor positioned to permit transfer of articles between said shuttle and said second conveyor.

Reference may also be made to U.S. Pat. No. 2,798,757 wherein this invention relates to improvements in articles handling and lifting apparatus. It is more particularly designed for grafting, lifting and transferring groups of small variable-sized articles such as eggs.

Referring now also to (prior art) FIGS. 1A through 1D is should be noted that Singer Sewing Company has several fabric manipulation devices that are designed for manipulation of apparel fabric from soft muslin or lace to a heavier material such as denim. These devices do not work reliably in all cases for fiberglass fabric because of the open weave, random structure, porosity and entanglements between adjacent fibers. The long needle 90 shown in FIG. 1A has difficulty maintaining a grip on the fabric after pickup. The Cardin wheel 92 shown in FIG. 1B induces fabric pattern distortion if the Cardin travel is not controlled properly. The soft tooth pincher 94 shown in FIG. 1C causes the glass filaments to break when subjected to the pinching action. The barbed needle 96 shown in FIG. 1D is hard to retract from the fabric after the needle has penetrated the fabric if the needle remain protruded under normal conditions as is the present case. It can therefore be seen that wherein several apparatus have been developed to manipulate fabrics commonly used in the textile industry these same apparatus cannot be successfully used in all cases to manipulate different varieties of fiberglass fabric.

A process therefore needs to be developed that results in the manipulation of one sheet, or a plurality of sheets of different porous fiberglass fabric(s). The apparatus used in the process should be capable of repeatable operation to lend itself to the economic assembly of articles of manufacture.

SUMMARY OF THE INVENTION

The present invention utilizes the drag force generated by viscous fluid as the fluid flows by a stationary object. The invention comprises a series of flow openings through which a viscous fluid such as air is drawn. The flow openings are moved adjacent to a section of porous fabric which lies on either a hard surface or on a stack of other fabric. As the air flows by the fibers adjacent the face of the flow opening, the drag force overcomes the gravitational force on the fabric, which causes the fabric to become attached or fluid coupled to the apparatus.

The magnitude of the pressure drop in the air flow across the thickness of the porous fabric can be estimated by use of the Ergun [1] equation give as follows:

$$\frac{\Delta P}{\Delta L} = \frac{150 \mu V_{balance} (1 - \epsilon)^2}{D_p^2 \epsilon^3} + \frac{1.75 \delta V_{balance}}{D_p} \frac{(1 - \epsilon)}{\epsilon^3}$$

where
$\epsilon$ = void fraction in material
$\delta$ = density of solid (i.e. glass)
$\mu$ = gas viscosity
$D_P$ = characteristic dimension of glass fibers in the fabric
$V_{balance}$ = average velocity of gas flow
g = acceleration of gravity
$\Delta P$ = pressure drop across material
$\Delta L$ = "thickness" of material
(1) Bird, Stewart, and Lightfoot, Transport Phenomena, John Wiley, 1960 pp. 200.

This equation may be used to estimate the hypothetical equilibrium flow rate through the flow openings. The flow rate that is calculated represents that required to maintain a balance between gravitational and drag forces. The flow rate, however, has to be greater than that required for equilibrium since the fabric piece during manipulation is subjected to acceleration and deceleration forces.

The actual flow rate Qactual is therefore estimated as follows:

$Q_{balance} = V_{balance} \times$ Area of Flow Opening(s)     (1)

$Q_{actual} = F_H \times \frac{\text{Area of Fabric}}{\text{Total Area of Flow opening(s)}} \times Q_{balance}$     (2)

(where $F_H$ = handling factor)

The handling factor $F_H$ can be in the range of 1 to 2 depending upon what operations may be expected during the handling process. The ratio of fabric area to total flow opening area is a trade-off between the number of flow openings and the flow rate. In other words, a higher flow rate through few flow openings may be used versus a lower flow rate through more flow openings. In a preferred embodiment of the invention, the area of the flow opening(s) is from about 1/180 to about 1/100 of the area of the fabric to be manipulated.

Returning now to the Ergun equation, the computation of the characteristic dimension $D_P$ can only be approximated. This is because the structure of the fabric varies considerably between continuous random mat on one end and triax knitted fabric on the other. In practice, the characteristic dimension can be assumed to be the diameter of the fiber bundle as a whole. This diameter is different for each of the different fabric constructions.

Typical parameter values for the different fabrics are shown in Table 1, which also includes estimated and measured flow velocities for different fabrics obtained during pick-place operations using a gantry robot to manipulate 18" square fabric stacks with the flow locators illustrated in FIGS. 2 and 3 having the flow opening patterns as shown in FIGS. 4 and 5.

It should be well recognized that the apparatus may easily be used to manipulate three dimensional sheets of fabric by location of fluid openings at the end of the flexible tubes as shown in FIGS. 6 and 7. Additionally, the contact of a flow locator with stacked layers of fabric may be cushioned by the interposition of a flexible member between the flow locator in the stack, as shown in FIG. 8.

In a preferred embodiment of the present invention therefore, an apparatus is disclosed for moving at least one layer of porous fabric either from a hard surface or from a stack of other porous fabrics wherein the apparatus comprises at least one flow locator with at least one flow opening defined therethrough, means for moving a fluid such as air through the flow opening to generate the viscous drag forces discussed earlier, and finally, means for moving the flow opening(s) of the flow locator adjacent the layer of fabric so as to fluid couple the flow locator to the layer, and to thereafter move the flow locator and the layer away from the hard surface or stack. In a preferred embodiment, the means for moving a flow locator with or without the attached layer of fabric comprises a gantry robot system.

It is therefore an object of the present invention to disclose a method and apparatus for the manipulation of porous fabrics.

It is a feature of the present invention to use viscous drag forces generated by the flow of fluid through the porous fabric to move discreet numbers of fabric layers from one location to another.

These and other features, objects and advantages of the present invention will become apparatus from the following detailed description, wherein reference is made to the figures in the accompanying drawing.

IN THE DRAWINGS

FIGS. 1A-1D are schematic representations of a number of apparatus of the prior art.

FIG. 2 showns a pictorial representation of a laminate assembly apparatus having several flow locator systems.

FIG. 9 is a Table 1 of flow and characteristic dimension values for different fabrics.

DESCRIPTION OF THE PREFERRED EMBODIMENT

Referring now to FIGS. 1A-1D, a number of prior art fabric manipulation devices are shown. It should be noted again that, in some cases, these devices when tested with different fiberglass fabric either damaged and/or distorted the orientation of the fibers beyond the limits necessary for the construction of fiber reinforced plastic articles of manufacture.

Figure 1A:
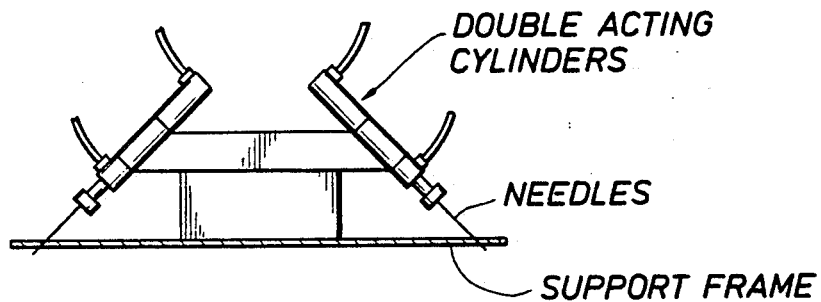
Figure 1B:
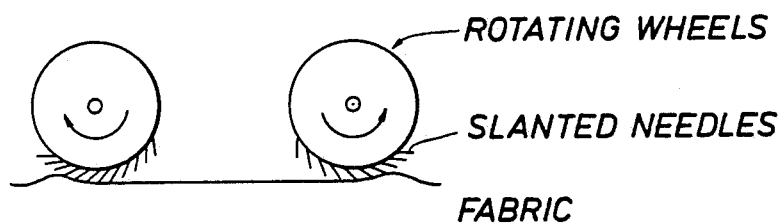
Figure 1C:
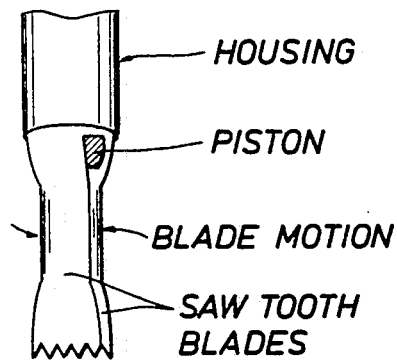
Figure 1D:
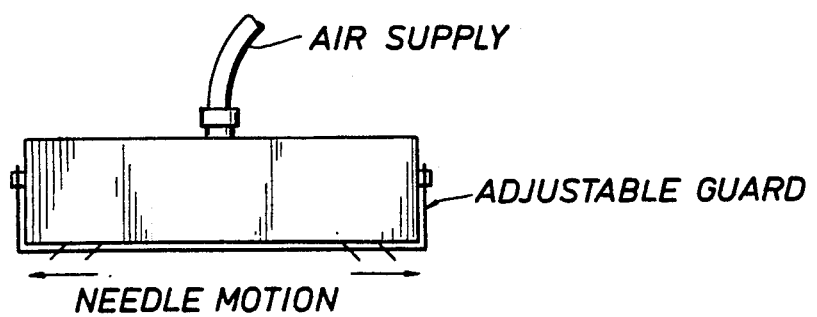
Figure 2:
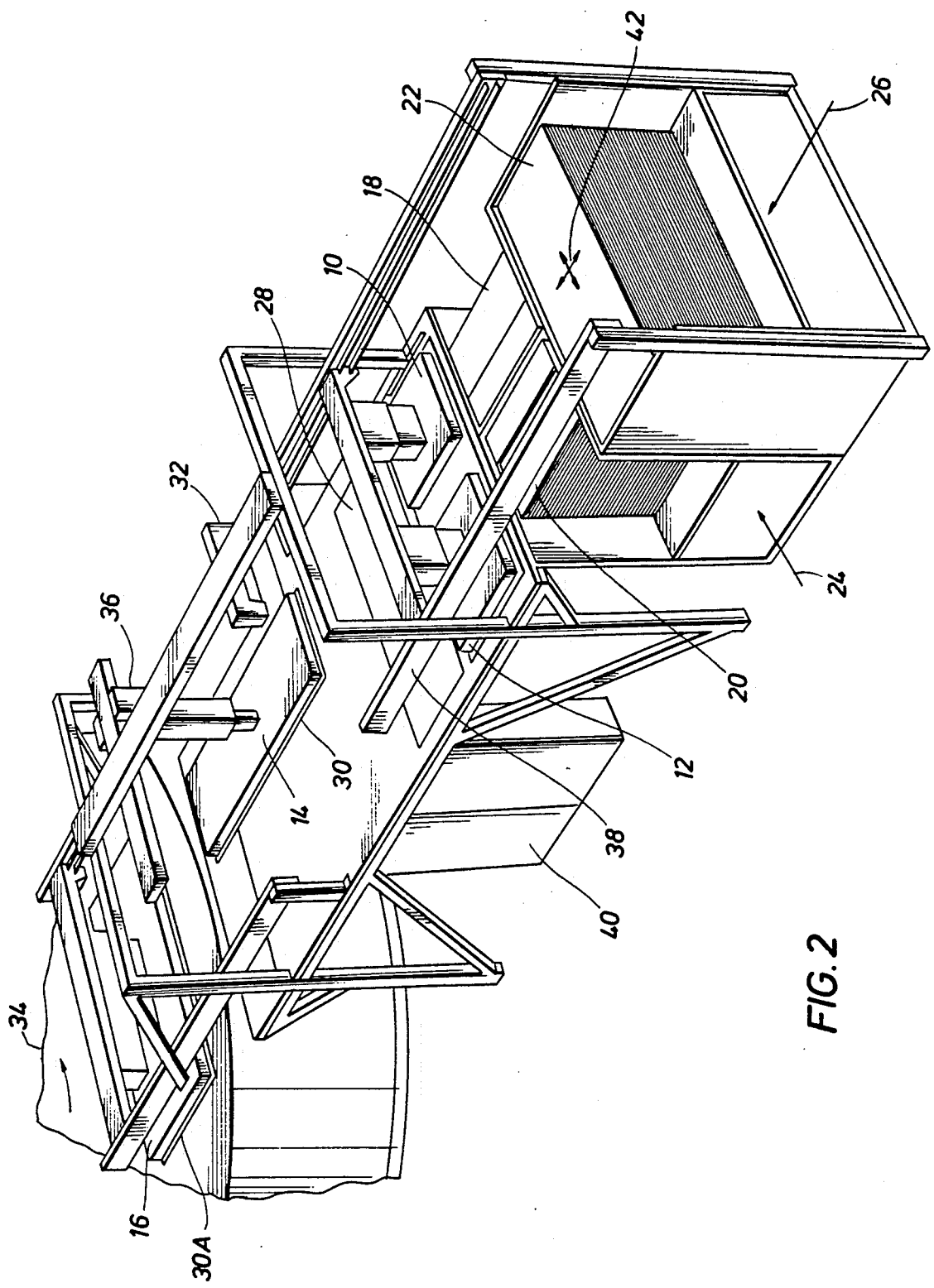

Referring now to FIG. 2, a plurality of flow locators A1, 10, A2 12, C 14 and D 16 are used to move various fiber glass fabrics such as knitted triax fabric 18 (for example Proform/Kyntex (CDB-340), plain woven fabric 20 (Proform/Kyntex B180), and knitted biax fabric 22 (Proform/Kyntex CD190), from the short sheet feed station 24 and the long sheet feed station 26 to the laminate forming table 28 for stacking in a preferred order. The laminate 30 formed at the forming table 28 is thereafter lifted by the flow locator C 14 and then moved into a position such that the edges of the laminate 30 may be sewn together by sewing system 32. Flow locator D 16 thereafter moves the sewn laminate 30A to rotating table 34 for subsequent delivery to another assembly and/or molding station.

The flow locators are moved by a plurality of gantry robots 36 such as the Mars 200 robot manufactured by Singer Sewing Company, which typically consists of rails 38 and control station 40 as is well known to the art.

It is an advantage of the present invention that many different fabrics may be loaded into feed stations 24, 26 and thereafter manipulated by the flow locators in order to deliver a completed laminate structure to the rotating table 34. Additionally, separate sheets may have various areas 42 and different weave structures. The air flow through the flow locators may be adjusted prior to picking up fabric of a different type by control station 40.

Figure 3A:
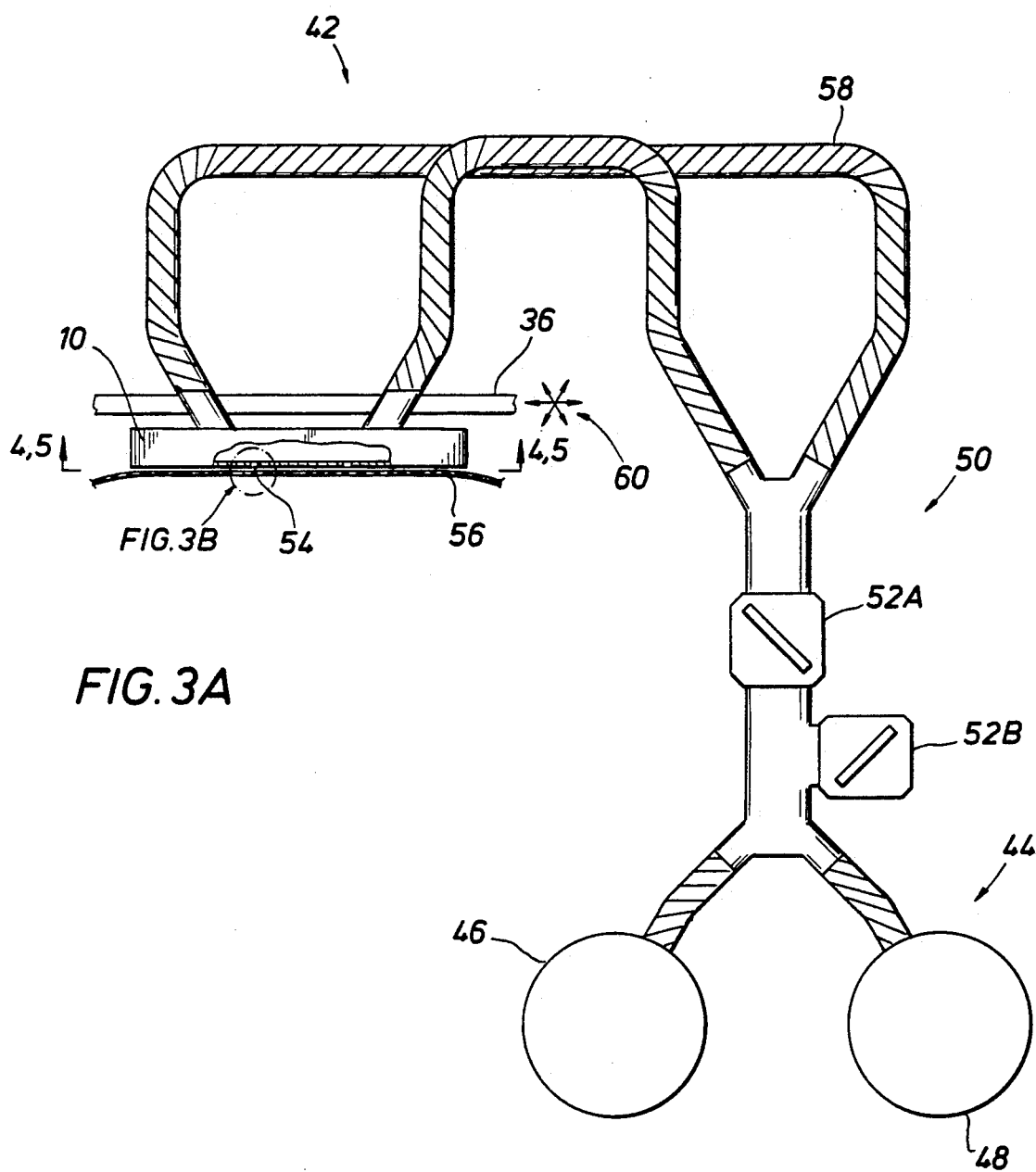
FIGS. 3A-3B show a schematic representation in partial cross section of the flow locator means.

Referring now to FIG. 3A, flow locator means 42 are shown, having flow locator A1 10, fluid movement means 44 such as air blower A 46 and air blower B 48, (each blower having in a preferred embodiment 1.854 horsepower and an air flow rate of 220 cubic feet/min). Flow locator means 42 also include flow adjustment means 50 such as the two-way control valves 52A, 52B used to control the amount of air passing upwardly through each individual flow opening 54 through the layer of porous fabric 56. Flexible hose connections 58 allow movement of the flow locator by movement means 60 in a preferred embodiment comprising at least one gantry robot 36 such as the Mars 200 robot discussed earlier. The movement means, as mentioned earlier, move at least one flow opening of at least one flow locator adjacent the layer(s) of porous fabric(s) so as to fluid couple the flow locator to the layer(s), and to thereafter move the flow locator and the layer to another location.

Figure 3B:
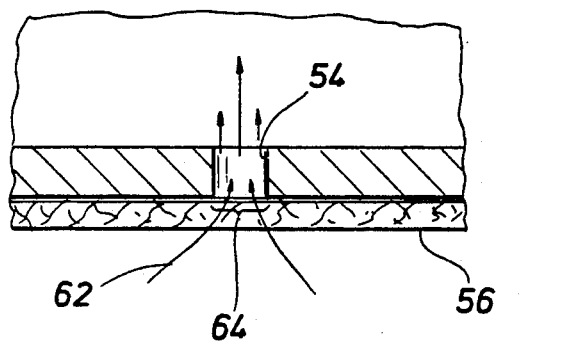

FIG. 3B shows the fluid 62 flow through the flow opening area 64 of flow opening 54 and through the porous fabric 56.

Figure 4:
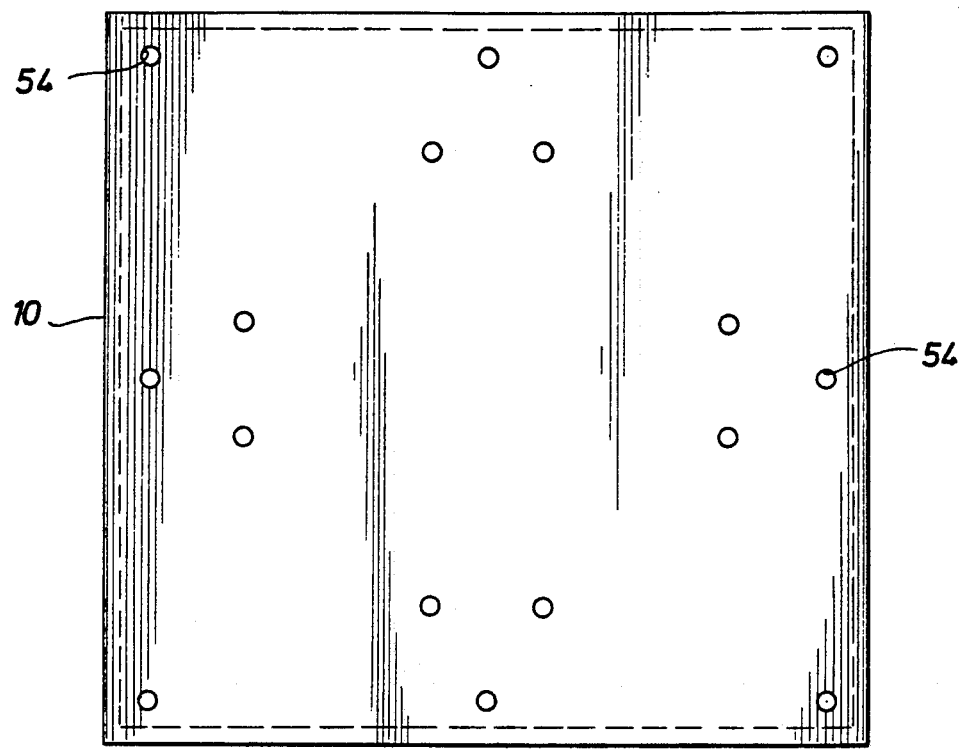
FIG. 4 shows a schematic representation in bottom view of a flow locator taken along lines 4—4 of FIG. 3A.

Referring now to FIG. 4, the pattern of flow openings 54 used on the bottom of flow locator A1 10 is shown. The location of the flow openings were selected to keep a uniform distribution in the four quadrants of the fabric. Note that this pattern of 16 holes was used to pick up knitted and woven as well as chopped strand fabric, with the exception of the continuous random mat.

Figure 5:
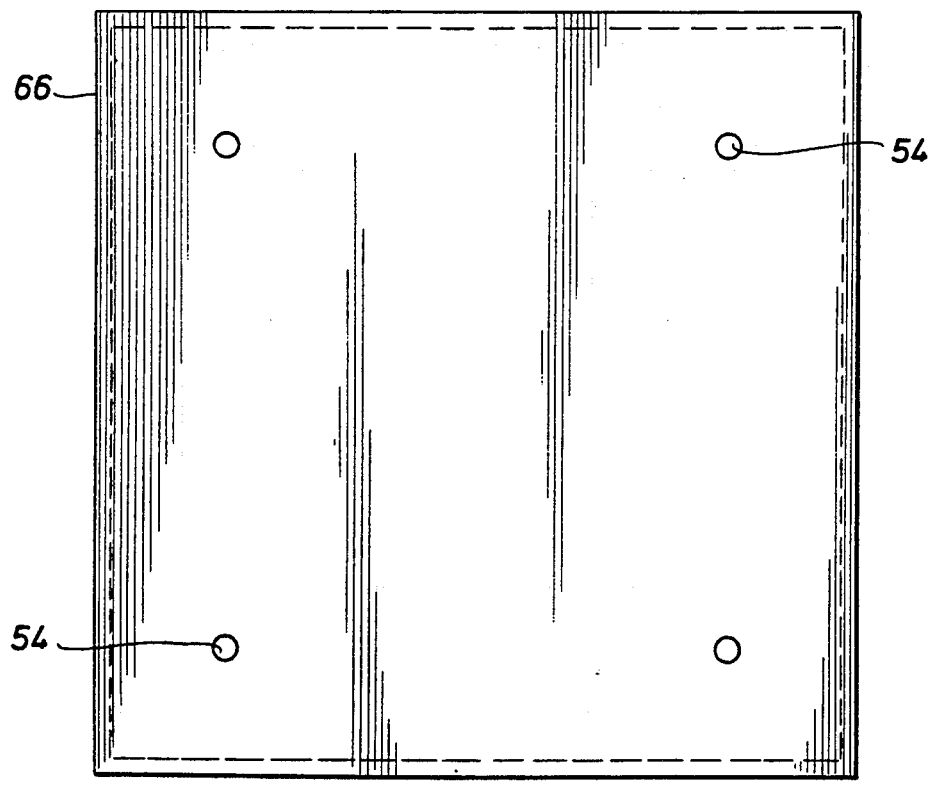
FIG. 5 shows a schematic representation in bottom view of a flow locator taken along lines 5—5 of FIG. 3A.

Referring now to FIG. 5, a flow locator B 66 is shown having flow openings 54. The location of the four holes as well as their diameter was selected to pick up and manipulate the continuous random mat, wherein it was found that a minimum number of holes having a high flow rate was required to fluid couple the mat to the flow locator, versus using the 16 holes of the flow locator A1 10 design used to manipulate the woven and chopped strand porous fabric layers.

Figure 6:
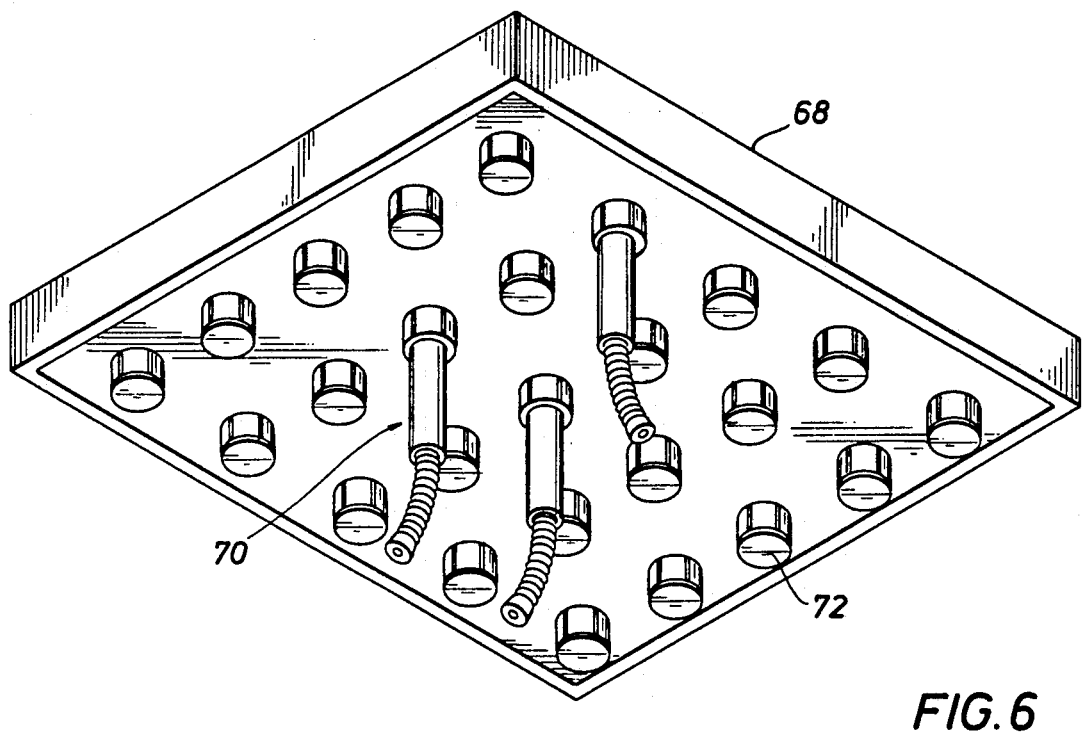
FIG. 6 shows a pictorial isometric representation in bottom view of a flow locator having orientation adjustment means depending therefrom.

Referring now to FIG. 6 in an alternative embodiment, flow locator E having orientation adjustment means 70 depending downward therefrom may be used to pick up fabric that is not stacked in flat sheets, but is located in a curvilinear three-dimensional manner. Caps 72 have been placed over flow openings in areas where it is not required to place any orientation adjustment means 70.

Figure 7:
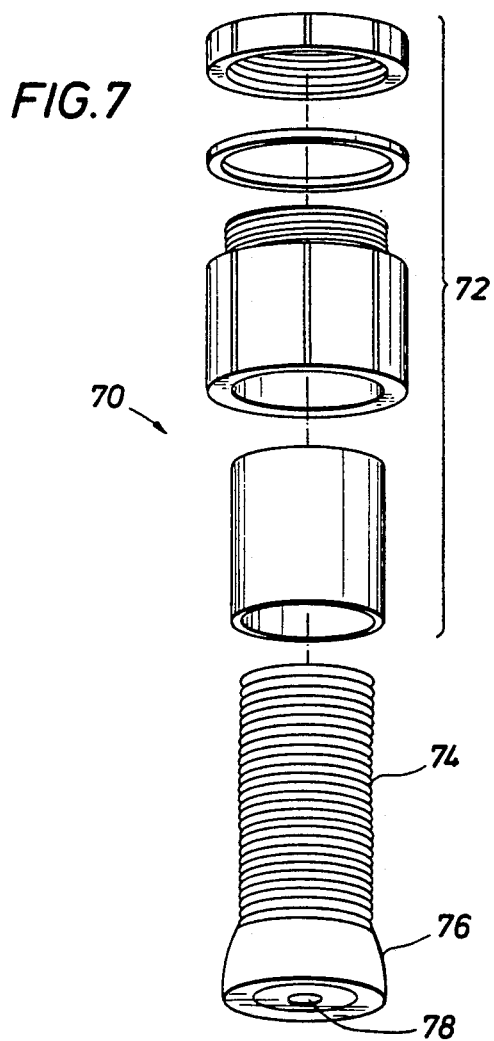
FIG. 7 shows a schematic isometric representation in exploded view of one of the orientation adjustment means of FIG. 6.

Referring now to FIG. 7 the flow orientation adjustment means 70 may be seen in more detail. In a preferred embodiment mount means 72 comprising a pipe coupling apparatus well known to the art operatively engages the flexible tube 74 to the flow locator E 68. End effector A 76 is operatively engaged to the end of flexible tube 74. The flow orientation adjustment means 70 can also be seen to include a fluid opening 78 defined therethrough and placed in fluid communication with the flow opening of the flow locator E 68. The flexible tube 74 may be bent in a preferred manner to position the fluid opening 78 in anticipation of contact with a portion of a curvilinear stack of layered fabric.

Figure 8:
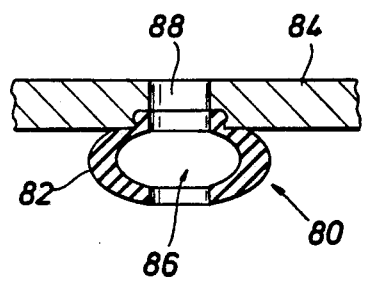
FIG. 8 shows a schematic representation in a cross section of a contact cushioning means operatively engaged to the flow locator.

Referring now to FIG. 8, in an alternative embodiment of the present invention contact cushioning means 80 having a flexible wall can be seen operatively engaged to the bottom of a typical flow locator 84, wherein cushioning means 80 have a fluid opening 86 defined therethrough placed in fluid communication with the flow opening 88. The purpose of cushioning means 80 is to cushion the contact of the flow locator with the stack of layers of porous fabric.

The advantages of the present invention allow the fabric, in single or multipe layers, to be picked up and manipulated without support on the back-side during manipulation operations, which is especially important during manipulation operations of a curvilinear-disposed stack of fabric, since any back support member would required extensive shaping and forming operations. The invention also allows the manipulation process to be automated for economic manufacture of various articles, without damage to the layers of fabric.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claims as our invention:

1. An apparatus for separating at least one curvilinear non-planar layer of porous fabric having a known periphery from a curvilinear non-planar stack of porous fabrics, said apparatus comprising:
    a plurality of flow orientation adjustment means, each adjustment means having a first end and a second end, said first end having mount means operatively engaged to a flow locator, said second end having an end effector with a fluid opening defined therethrough, said mount means and said end effector flexibly connected to each other in a fluid tight manner by a moveable manually rebendable flexible tube having constant wall thickness, said tube manually rebendable to fixedly aim said end effector fluid opening into anticipated orthogonal contact with said curvilinear non-planar stack of porous fabrics, said fluid opening in fluid communication with a flow opening defined in a bottom surface of said flow locator, said end effector manually aimable to a desired orientation independent of any other end effector,
    fluid movement means cable of moving fluid upward through said fluid opening and said flow opening, and
    means for moving in unison said plurality of flow orientation adjustment means so as to fluid-couple each of said adjustment means to said at least one non-planar curvilinear layer, and to thereafter move said flow orientation adjustment means and said at least one non-planar curvilinear layer from said stack.

* * * * *